2

United States Patent Office 3,632,645
Patented Jan. 4, 1972

3,632,645
SUBSTITUTED PHENYLACETYL DERIVATIVES OF GUANIDINE, O-ALKYLISOUREAS, S-ALKYLISO- THIOUREAS, AND P-NITROBENZYLISOTHIO- UREA
John Bernard Bream, Redbourn, Herts, and Claude W. Picard, Welwyn Garden City, Herts, England, assignors to Dr. A. Wander S.A., Berne, Switzerland
No Drawing. Filed Sept. 23, 1968, Ser. No. 761,806
Claims priority, application Switzerland, Sept. 26, 1967, 13,461/67
Int. Cl. C07c 103/30
U.S. Cl. 260—558    5 Claims

ABSTRACT OF THE DISCLOSURE

The invention provides acetyl-guanidine derivatives of formula:

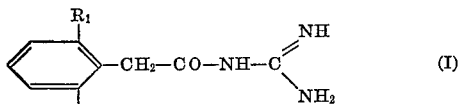    (I)

and

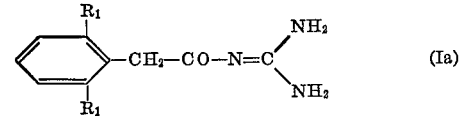    (Ia)

in which $R_1$ is a chlorine atom, or methyl radical.

The acetyl-guanidine derivatives are useful as antihypertensives.

---

This invention relates to acetyl-guanidines and their preparation.

The present invention provides compounds of general Formula I,

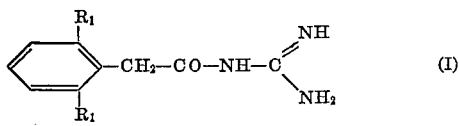    (I)

in which $R_1$ signifies a chlorine atom or the methyl radical, and their tautomeric compounds of general Formula Ia

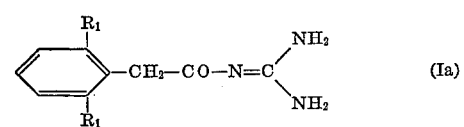    (Ia)

in which $R_1$ has the above significance, and their acid addition salts.

In the following description for the sake of brevity, a reference to compounds of general Formula I is intended also to embrace the tautomeric compounds of Formula Ia.

The compounds of general Formula I and their acid addition salts may be obtained by a process characterized either by
(a) reacting a compound of general Formula II,

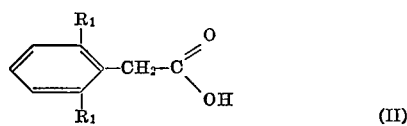    (II)

in which $R_1$ has the above significance, or a reactive, functional acid derivative thereof, with guanidine, or
(b) reacting with ammonia a compound of general Formula III,

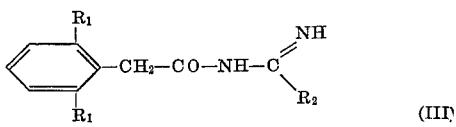    (III)

in which $R_1$ has the above significance and
$R_2$ signifies a reactive radical capable of being split off together with one of the hydrogen atoms in ammonia, and when the resulting compound of Formula I is obtained in the form of a salt, optionally liberating the free base therefrom, and/or when the resulting compound of Formula I is obtained in the free base form, optionally salifying it.

In the process described under section (a), suitable reactive, functional acid derivatives of the compounds of Formula II include halides preferably chlorides or bromides, and lower alkyl esters. When a halide is used and it is desired to obtain the compound of Formula I in the form of a free base directly, the reaction may be effected in the presence of an acid binding agent e.g. triethylamine, or by using at least a 100% excess of guanidine. It will be appreciated that in the absence of such an acid binding agent or excess of guanidine, a salt of the compound of Formula I may be obtained, from which the free base may be liberated in manner known per se e.g. by treatment with dilute aqueous alkali metal hydroxide solutions.

The reaction described under section (a) is preferably carried out in the presence of an organic solvent which is inert under the reaction conditions e.g. isopropanol or toluene. It may be carried out at a temperature between room temperature (20-25° C.) and the reflux temperature of the reaction medium, preferably between room temperature and 80° C. The progress of reaction may be followed by, for example, thin layer chromatography.

In the process described under section (b) suitable starting materials include, for example, those wherein the reactive radical is a lower alkoxy, lower alkylthio or a substituted or unsubstituted aralkylthio radical, especially a methoxy, methylthio, or n-nitrobenzylthio radical. The reaction is preferably effected in an organic solvent which is inert under reaction conditions e.g. isopropanol. The ammonia reactant is suitably in the form of a concentrated aqueous solution and the reaction mixture may be stirred at a temperature between 20° and 80° C. for 6 to 24 hours in order to complete the reaction.

The compounds of Formula I produced in accordance with the above processes may be isolated in manner known per se e.g. by extraction, precipitation or salt formation, and may be purified in manner known per se e.g. by recrystallization.

The compounds of general Formula I are solid, basic compounds at room temperature. They may be converted into their acid addition salts by reacting with suitable organic or inorganic acids. Suitable organic acids for acid addition salts formation include toluene sulphonic acid, acetic acid, malonic acid, succinic acid, malic acid, maleic acid, and tartaric acid and suitable inorganic acids include hydrohalic acids, sulphuric acid, nitric acid and phosphoric acid.

The compounds of general Formula II used as starting materials in section (a) are known; the functional acid derivatives of compounds of general Formula II used in accordance with the invention are known or may be produced in manner known per se.

The compounds of general Formula III used as starting materials in section (b) are new and together with the process for their production also form part of the present invention.

The compounds of Formula III may be prepared by reacting a halide preferably a chloride or bromide, of a compound of Formula II with a compound of Formula VII,

in which $R_2$ has the above significance.

The process may be carried out in an organic solvent which is inert under the reaction conditions e.g. acetone, preferably at room temperature. Preferred reactants of Formula VII are compounds wherein the carbon atom carries a lower alkoxy, lower alkylthio or a substituted or unsubstituted aralkylthio radical, especially a methoxy, methylthio, or p-nitrobenzylthio radical as substituent. When said substituent is a substituted or unsubstituted aralkylthio radical, an excess of the reactant is preferably used.

The resulting compounds of general Formula III may be isolated in manner known per se, e.g. by precipitating with a precipitant, and may subsequently be purified in manner known per se, e.g. by recrystallization.

The compounds of general Formula VII used as starting materials for the above process are known or may be produced in manner known per se.

The compounds of general Formula I and their pharmaceutically acceptable acid addition salts are useful because they possess pharmacological activity in animals. They are useful as antihypertensives having a beneficial effect particularly with regard to essential and renal hypertonia, as indicated by the "nictitating membrane" test in cats.

The antihypertensive effect is demonstrated by a subsiding of the contraction of the nictitating membrane in cats in the case of preganglionic and postganglionic stimulus of the neck sympathicus. In order to measure this effect the dose of active compound ($ED_{50}$) is ascertained with which a 50% reduction of the nictitating membrane contraction occurs [Caviezel R. et al., Archiv Internat. de Pharmacodynamic et de Thérapie 141, 331 (1963)]. The following table gives a comparison of the values ascertained for the 2,6-disubstituted phenyl-acetyl-guanidines of the invention with those of guanethidine known as the most effective antihypertensive, whereby the superiority of the compounds of the invention is demonstrated.

| Active compound: | Reduction of the neck sympathicus stimulus $ED_{50}$ mg./kg. i.v. (cats) |
|---|---|
| 2,6-dichlorophenyl-acetyl-guanidine | 0.3 |
| 2,6-dimethylphenyl-acetyl-guanidine | 1.0 |
| Guanethidine | 2.0 |

For the above-mentioned use, the dosage administered will, of course, vary depending upon the compound employed, mode of administration and treatment desired. However, in general, satisfactory results are obtained for the larger mammals at a total daily dosage in the range of from about 1 to about 10 mg., and dosage forms suitable for oral administration, e.g. as tablets, dragées, or for parenteral administration, e.g. as injectable solutions, comprise from about 1 to 2 mg. of the compound administered with a solid or liquid pharmaceutical carrier or diluent.

In the following non-limitative examples, all temperatures are uncorrected.

EXAMPLE 1

2,6-dichlorophenyl-acetyl-guanidine

A solution of 3.245 g. (0.055 mole) of guanidine in isopropanol is added to a solution of 11.7 g. (0.05 moles) of 2,6-dichlorophenyl-acetic acid ethyl ester (B.P. 142–143° C./12 mm. of Hg) in 20 cc. of isopropanol. The reaction mixture is allowed to stand overnight and is subsequently concentrated by evaporation. After recrystallizing the residue from methanol/ether 2,6-dichlorophenyl-acetyl-guanidine is obtained in the form of white grains having a melting point of 225–227° C.

EXAMPLE 2

2,6-dichlorophenyl-acetyl-guanidine hydrochloride

A solution of 5.6 g. (0.025 moles) of 2,6-dichlorophenylacetic acid chloride (B.P. 137–138° C./12 mm. of Hg) in 10 cc. of toluene is added dropwise to a mixture of 4.5 g. (0.076 moles) of guanidine and 60 cc. of toluene. The reaction mixture is allowed to stand at room temperature for 20 minutes, is then heated on a steam bath for 2 hours and is subsequently cooled. The resulting precipitate is filtered off and washed twice with 25 cc. amounts of water in order to separate the guanidine hydrochloride. The residue (2,6 - dichlorophenyl-acetyl-guanidine) is washed with chloroform for further purification and is then dissolved in 50 cc. of isopropanol. The pH-value of the solution is adjusted to 6 with ethanolic hydrochloric acid and the solution is cooled. The resulting white needles are again washed with chloroform. The resulting 2,6 - dichlorophenyl - acetyl - guanidine hydrochloride has a melting point of 213–216° C.

EXAMPLE 3

2,6-dimethylphenyl-acetyl-guanidine hydrochloride

A solution of 17.8 g. (0.1 mole) of 2,6-dimethylphenyl-acetic acid methyl ester (B.P. 122–123° C./11 mm. of Hg) in 100 cc. of isopropanol is added at room temperature to a stirred solution of 6.5 g. (0.11 moles) of guanidine in 100 cc. of isopropanol. The reaction mixture is subsequently stirred for a further hour and is then concentrated by evaporation in a vacuum. The resulting rubber-like residue, consisting of 2,6-dimethylphenyl-acetyl-guanidine, is dissolved in isopropanol and the pH value of the solution is adjusted to 2 with ethanolic hydrochloric acid. White needles are obtained, which are separated and rewashed with isopropanol. 2,6-dimethylphenyl-acetyl-guanidine hydrochloride, having a melting point of 229–231° C. (with decomposition) is obtained.

EXAMPLE 4

2,6-dichlorophenyl-acetyl-guanidine hydrochloride

A solution of 65.7 g. (0.3 moles) of 2,6-dichlorophenyl-acetic acid methyl ester (B.P. 149° C./17 mm. of Hg) in 200 cc. of isopropanol is added to a solution of 19.5 g. (0.33 moles) of guanidine in 150 cc. of isopropanol. The resulting reaction mixture is stirred for 15 minutes and is then concentrated by evaporation in a vacuum. The resulting white residue, consisting of 2,6-dichlorophenyl-acetyl-guanidine, is suspended in 100 cc. of isopropanol, whereupon acidification is effected with ethanolic hydrochloric acid. The resulting precipitate is crystallized from isopropanol/ethanol and recrystallized from ethanol. 2,6 - dichlorophenyl - acetyl - guanidine hydrochloride is obtained in the form of white needles having a melting point of 215–217° C.

EXAMPLE 5

2,6-dichlorophenyl-acetyl-guanidine 10 cc. of a concentrated aqueous ammonia solution are added to a solution of 1.4 g. (0.005 moles) of S-methyl- N-2,6-dichlorophenyl-acetyl-isothiourea in 40 cc. of isopropanol and the resulting reaction mixture is stirred at 60° C. for 15 hours. Upon cooling a precipitate is formed which is filtered off and washed with water. 2,6-dichlorophenyl-acetyl-guanidine is obtained in the form of white needles having a melting point of 220–226° C.

The S-methyl-N-2,6-dichlorophenyl-acetyl-isothiourea, used as starting material in the above example, is produced as follows:

(a) S-methyl-isothiourea.—29.4 g. (0.105 mole) of dried pulverized S-methyl-isothiouronium sulphate are added to a solution cooled to 0° C. of 4.6 g. (0.2 moles) of sodium in 150 cc. of methanol and the suspension is stirred for 2 hours. The precipitated sodium sulphate is filtered off and the filtrate concentrated by evaporation in a vacuum and ether is added thereto, whereby S-methyl-isothiourea, having a melting point of 75–78° C. (with decomposition) is obtained.

(b) S-methyl-N-2,6-dichlorophenyl-acetyl-isothiourea.—A solution of 5.6 g. (0.025 mole) of 2,6-dichlorophenylacetyl-acetyl chloride (B.P. 137–138° C./12 mm. of Hg) in 10 cc. of acetone is slowly added to a solution of 4.7 g. (0.052 mole) of S-methyl-isothiourea in 120 cc. of acetone, whereby the temperature of the mixture rises to 35° C. The resulting white precipitate (S-methyl-isothiourea hydrochloride) is filtered off. The filtrate is evaporated in dryness, whereby S-methyl-N-2,6-dichlorophenyl-acetyl-isothiourea, having a melting point of 108–112° C., results. After recrystallizing twice from di-isopropyl ether the melting point rises to 125–127° C.

EXAMPLE 6

Description of a tablet composition

|  | Mg. |
|---|---|
| 2,6-dichlorophenyl-acetyl-guanidine hydrochloride | 2 |
| Lactose | 116 |
| Paraffin oil | 2 |
| Gelatin | 1 |
| Maize starch | 13 |
| Talcum | 6 |

The weight of the tablets produced depends on the amount of active compound to be administered. The tablets may be provided with a breaking slit.

What is claimed is:

1. A compound selected from the group consisting of compounds of the formula

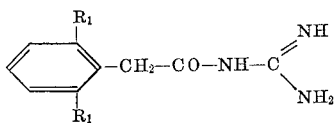

in which $R_1$ is chloro or methyl, and their tautomeric compounds of the formula

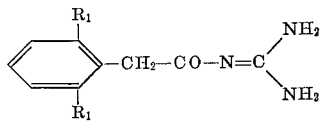

in which $R_1$ is chloro or methyl, and their pharmaceutically acceptable acid addition salts.

2. A compound according to claim 1 in which each $R_1$ is chloro.

3. A compound according to claim 1 in which each $R_1$ is methyl.

4. A compound of the formula

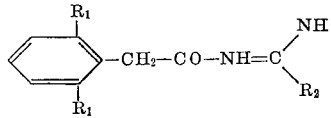

in which $R_1$ is chloro or methyl and $R_2$ is lower alkoxy, lower alkylthio, or p-nitrobenzylthio.

5. The compound according to claim 4, in which each $R_1$ is chloro and $R_2$ is methylthio.

References Cited

UNITED STATES PATENTS 3,414,614   12/1968   Julia _____ 260—558

HENRY R. JILES, Primary Examiner

H. I. MOATZ, Assistant Examiner

U.S. Cl. X.R.

424—324; 260—5.58 S

UNITED STATES PATENT AND TRADEMARK OFFICE

CERTIFICATE EXTENDING PATENT TERM
UNDER 35 U.S.C. 156

Patent No. : 3,632,645

Dated : January 4, 1972

Inventor(s) : John Bernard Bream, et al

Patent Owner : Sandoz Pharmaceuticals Corporation

This is to certify that there has been presented to the

COMMISSIONER OF PATENTS AND TRADEMARKS an application under 35 U.S.C. 156 for an extension of the patent term. Since it appears that the requirements of law have been met, this certificate extends the term of the patent for the period of

2 YEARS with all rights pertaining thereto as provided by 35 USC 156(b).

I have caused the seal of the Patent and Trademark Office to be affixed this Twenty-second day of December 1987.

Donald J. Quigg

Assistant Secretary and Commissioner of Patents and Trademarks

Disclaimer 3,632,645.—*John Bernard Bream*, Redbourn Herts, and *Claude W. Picard*, Welwyn Garden City, Herts, England. SUBSTITUTED PHENYL-ACETYL DERIVATIVES OF GUANIDINE, O-ALKYLSOUREAS, S-ALKYLISOTHIOUREAS, AND P-NITROBENZYLISOTHIOUREA. Patent dated Jan. 4, 1972. Disclaimer filed Sept. 27, 1990, by the assignee, Sandoz Pharmacueticals Corp.

The term of this patent subsequent to Oct. 25, 1990, has been disclaimed.
  *[Official Gazette Feb. 19, 1991]*